Patented Sept. 12, 1922.

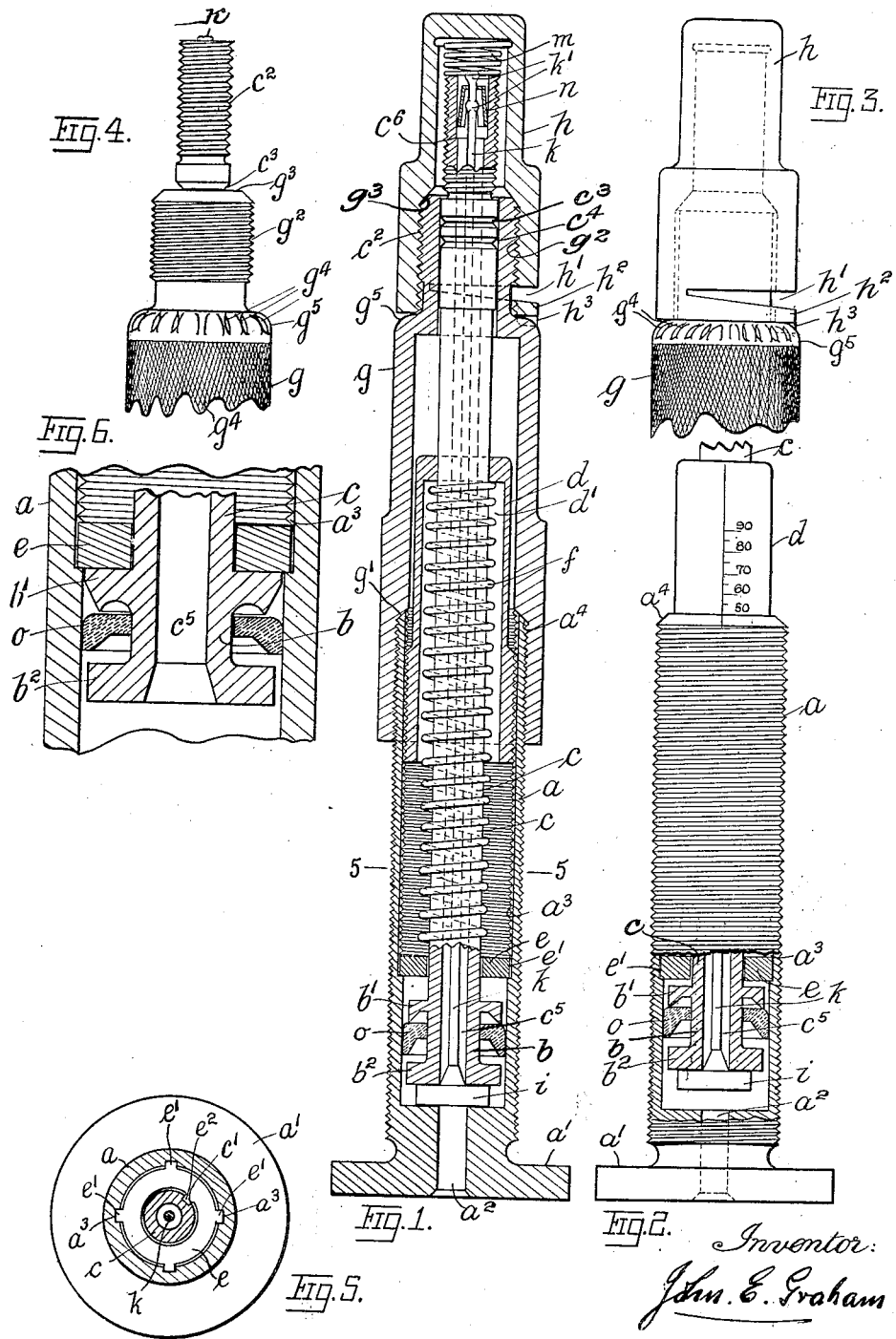

1,428,776

UNITED STATES PATENT OFFICE.

JOHN ELPHINSTONE GRAHAM, OF LONDON, ENGLAND.

COMBINED PRESSURE GAUGE AND VALVE.

Application filed November 10, 1920. Serial No. 423,072.

*To all whom it may concern:*

Be it known that I, JOHN ELPHINSTONE GRAHAM, a subject of the King of Great Britain and Ireland, residing at London, England, have invented certain new and useful Improvements in Combined Pressure Gauges and Valves, of which the following is a specification.

This invention relates to improvements in combined valve and pressure gauges for pneumatic tyres and the like and refers more particularly to devices of the kind in question wherein a piston or plunuger is employed, against one side of which the air acts to move the said plunger outwardly against the action of a spring.

One of the principal features of the invention consists in the employment of adjusting means whereby the device may be set or adjusted to indicate any predetermined pressure, said adjusting means being arranged in such a manner that the movement of the plunger to indicate when the required pressure has been reached is reduced to a minimum, whilst adjusting means gives any indication of pressure without increasing the normal length of the device.

A second feature of the invention consists in the employment of a valve which acts as a stop valve to cut off communication between the interior of the tyre or the like and the pressure gauge when the latter is not recording and to act as a check valve when the pressure gauge is recording.

A third feature of the invention is the construction of the device such that the plunger or piston and its stem may be held rigid when no record is being taken with the object of preventing harmful vibration.

In order that the invention may be readily understood, reference is made to the accompanying drawings in which:—

Fig. 1 is a vertical sectional elevation through a combined valve and air pressure gauge constructed according to the invention, and showing the piston and valve on the lower seat with check valve closed.

Fig. 2 is a similar view of the lower portion of the device in which the piston and valve are off the lower seat and the check valve closed.

Fig. 3 is an elevation of the dust cap showing the locking means for retaining same in position.

Fig. 4 is a side view of the top of the device showing recording cap in position.

Fig. 5 is a horizontal sectional view on the line 5—5 Fig. 1.

Fig. 6 is a partial view of the plunger to an enlarged scale and of slightly modified construction.

Referring to the drawings $a$ indicates the barrel or casing having a flange $a^1$ and adapted to be secured in the usual manner to a pneumatic tyre. $a^2$ is a passage or port for air. Within the barrel is slidably mounted a piston $b$ having connected thereto a tubular rod $c$ the upper opposite end of which is externally threaded at $c$ to receive the screwed flexible connection of a pump or the like. On the tubular rod is a slidably mounted ring or plate $e$ forming a sliding fit within the barrel, as shown and provided with a series of projecting tongues or lugs $e^1$ adapted to engage and be supported by longitudinal grooves $a^3$ in the interior of the barrel and with an internal projection $e^2$ adapted to engage a longitudinal groove $c^1$ in the outer periphery of the tubular rod $c$. By this means the tubular rod $c$ is secured against independent rotation within the barrel $a$.

The interior of the barrel is threaded at its upper end to receive a screwed loading plug $d$ provided with a central longitudinal recess $d^1$ for the reception of a coil spring $f$ and with a central hole at its upper end through which the tubular rod $c$ slides. The lower end of the spring $f$ engages with and is supported by the upper surface of the ring $e$ which is normally supported by the lower end of the grooves $a^3$. The upper edge $a^4$ of the barrel is preferably tapered off, as shown, and the outer surface of the loading plug $d$ is provided with a series of graduations or markings as shown in Fig. 2, which markings may be arranged in any suitable manner to co-operate with the edge $a^4$ of the barrel. It will thus be seen that the loading plug may be adjusted longitudinally within the barrel $a$ by rotating the same to increase or decrease the load on the spring, the markings being arranged to indicate pressure to be applied to the underside of the piston in order to raise the same together with the rod $c$, to record.

The upper end of the barrel $a$ is externally screwed to receive the recording cap $g$ which is preferably provided with a shoulder or valve like seating $g^1$ adapted to locate the cap when the same is screwed on to the barrel, the shoulder $g^1$ engaging the tapered upper edge $a^4$ of the barrel as shown in Fig. 1. The upper end of the recording cap is externally threaded at $g^2$ to receive a screwed dust cap $h$ hereinafter referred to.

The tubular rod $c$ connected to the piston is provided in the neighbourhood of its upper end with grooves or the like $c^3$ $c^4$ respectively, the upper groove $c^3$ being arranged to coincide with the upper edge $g^3$ of the recording cap $g$ when the desired pressure has been reached, whilst the groove $c^4$ registers therewith when the air pressure has exceeded within certain limits the predetermined pressure.

Mounted on or within the piston $b$ is a valve of rubber or other suitable material, indicated at $i$, to which is rigidly attached a rod $k$ extending upwardly through the tube $c$. This valve constitutes both a stop valve for cutting off communication through the port $a^2$ between the tyre and the plunger, when the pressure gauge is not in use, whilst when the tyre is being inflated or it is desired to ascertain whether the tyre is fully inflated, the valve is moved upwardly against the plunger by air pressure within the tyre to close the passage $c^5$ through which the rod $k$ passes and thus constitutes a check valve, so that the whole of the pressure of air acts upon the under surface of the plunger $b$.

In order to cause the valve to close, the air passage $a^2$ when the tyre is inflated to the desired extent, the dust cap $h$ is provided at the bottom of the recess therein, with a small spring or other means $m$ which engages the top of the tubular rod $c$ and when the dust cap is screwed tightly on to the portion $g^2$ of the recording cap, this rod is pressed downwardly until the valve $i$ closes the aperture $a^2$. In order to prevent disconnection of the valve from the plunger and tubular rod, the rod $k$ of the valve carries in the neighbourhood of its upper end a small split metallic sleeve $n$ the lower edges of which engage a shoulder $c^6$ formed on the interior of the tubular rod $c$. The rod $k$ is preferably flattened or provided with projections $k^1$ in order to retain the split sleeve in position.

In order to prevent the dust cap $h$ from becoming disengaged from the recording cap $g$, its lower end is partially cut through, as shown at $h^1$ so as to leave a partially severed annular ring or the like $h^2$, the lower surface of which is provided with one or more projecting tongues or the like $h^3$ preferably arranged on the ring at a point furthest from the unsevered portion of the ring $h^2$. This projection co-operates with a series of radially disposed grooves $g^4$ formed on a shoulder $g^5$ of the recording cap. By this arrangement when the dust cap is screwed down tightly on to the threaded portion $g^2$ of the recording cap the projection on the partly severed ring $h^2$ engages one of the radial grooves $g^4$ and the transverse cut $h^1$ gives the ring $h^2$ a slight springiness which is sufficient to maintain the projection $g^5$ in engagement with the groove and thus prevent loosening of the cap due to vibration.

As will be seen more clearly in Fig. 6 the plunger $b$ preferably comprises two flanges or discs $b^1$ $b^2$ spaced apart with a preferably cupped washer of rubber, leather or other suitable material $o$ therebetween. The washer $o$ is preferably a loose fit around the piston whilst the under or inner face of the upper disc $b^1$ is formed with an annular groove or channel. When air under pressure is admitted to the interior of the barrel $a$ it acts upon the under face of the washer $o$ and presses the same upwardly into contact with the edge of the upper disc $b^1$ the area of which will be less than that of the washer $o$ and simultaneously the outer periphery of the washer is pressed into contact with the barrel. Now since air is permitted to pass through the small annular space between the washer $o$ and the central portion of the plunger $b$ thus nearly balancing the pressure above and below the former, it will be seen that the latter can make a slight upward movement without a similar movement of the washer thus relieving the latter of a certain proportion of the load should it be tending to stick and thereby allowing the pressure to act with better effect on its excess of area, such construction, which may be modified, being with the object of securing a free movement rather than a movement of upward jerks.

It will be understood that immediately the dust cap $h$ is placed in position, the rod $c$ will be depressed causing the passage $a^2$ to be closed by the valve $i$.

The lower groove $c^4$ coincides with the upper edge $g^3$ of the recording cap when the pressure of air within the tyre has exceeded the pressure at which the loading plug has been set, so that in all cases at whatever pressure the loading plug has been set, the movement of the tubular rod $c$ and the plunger is limited. If desired the rings $c^3$ and $c^4$ may be coloured red, so as to better show when the pressure reaches the predetermined degree.

It will be understood that the details of construction and the arrangement of parts may be modified without departing from the principle of the invention. The grooves or rings $c^3$ and $c^4$ may be replaced by other markings or indications, which may be arranged in any other relation than that shown in the drawings. The loading plug, may if desired, be screwed on to the outer surface of the barrel $a$, in which case the markings for indicating the various pressures for setting the loading plug may be formed on the barrel, said markings co-operating with the lower edge of the plug.

In place of the small dust cap which has to be removed to take record, I may provide that the recording cap has fixed location on the piston rod and sliding over the cylindrical portion, in which case, said cap would register pressure by its lower lip coinciding with a suitable mark or marks on the cylindrical portion and could be pressed down and suitably held when not in use, so as to hold the stop valve on orifice $a^2$, as aforesaid.

In some cases the piston rod $c$ may be made solid, whilst the lower end of the barrel $a$ may be provided with a screwed nozzle to which the flexible connection of the pump is attached. Within the nozzle is a valve adapted, when the nozzle is closed by a cap to cut off communication between the interior of the tyre and the underside of the piston, the construction of the valve being preferably similar to that hereinbefore described. In this construction the dust cap on the upper end of the recording cap, would not be required, but the piston rod would be provided with a suitable head to prevent admission of dust to the interior of the recording cap.

In order to restrict as far as possible the lateral outward expansion of the washer $o$, when under pressure the under surface of the upper disc $b^1$ of the plunger, instead of being grooved or hollowed out, may be formed with an inwardly and upwardly inclined surface, the upper surface of the washer $o$ being suitably shaped, so that the tendency of the washer when under air pressure is to compress inwardly towards the centre of the piston. In some cases the inclined under surface of the piston may be relieved or recessed, so as to permit the entry of air between the washer and the upper disc or flange $b^1$ of the piston.

In some cases it may be desirable to provide means to ensure the loading plug remaining in any adjusted position. For instance one end of the spring, preferably the upper end may be bent to engage a recess or slot in the bottom of the recess in the loading plug. Another method consists in providing one or both ends of the spring with an enlarged head or bead and to provide the parts co-acting therewith, that is the upper surface of the disc $e$ and/or the bottom of the central recess $d^1$ in the loading plug with a series of radially disposed grooves or serrations into which the bead or head on the spring engages.

What I claim and desire to secure by Letters Patent of the United States of America is:—

1. A combined valve and pressure gauge adapted for use with pneumatic tyres and the like comprising in combination a casing, a sliding piston in said casing, a loading plug adjustably connected to said casing, a spring between said loading plug and said piston, said plug serving to enable the load on the spring to be set or adjusted so that the air pressure when it reaches the value for which the loading plug has been set will have caused a movement of the piston to an invariable extent, an indicating cap fixed to said casing and a rod connected to said piston having markings co-operating with the indicating cap and serving to indicate by the movement of said rod itself, when the air pressure within the tyre has reached or exceeded the pressure for which the loading plug has been set.

2. A combined valve and pressure gauge, comprising in combination a casing, a slidable piston within said casing, a loading plug adjustably connected to said casing, a spring between said piston and said loading plug, an indicating cap fixed to said casing a rod attached to said piston and extending through the loading plug and cap, markings on said plug co-operating with the top of the casing to enable the load on said piston to be set to function at a predetermined pressure, markings on said piston rod co-operating with said indicating cap to indicate when the air pressure for which the loading plug has been set has been reached, a protective cap on said indicating cap, and a non-return and cut off valve in said casing adapted to be moved to a position to cut off the interior of said casing from the air pressure in the tyre by the placing in position of the protective cap.

3. A combined valve and pressure gauge adapted for use with pneumatic tyres and the like, comprising in combination, a casing, a slidable piston in said casing, a loading plug adjustably connected to said casing, a spring between said loading plug and said piston, said plug serving to enable the load on the spring to be set or adjusted so that the air pressure, when it reaches the valve for which the loading plug has been set, will have caused a movement of the piston to an invariable extent, an indicating cap fixed to said casing, a hollow rod attached to said piston having markings co-operating with the top of said indicating cap and serving to indicate by the movement thereof when the air pressure within the tyre has reached the pressure for which the loading plug has been set, a double acting valve mounted on said piston, co-operating with a port loading to the interior of the tyre and the bottom of said hollow rod, a rod attached to said valve extending through said hollow piston rod, and a protective cap adapted to be attached to said indicating cap and serving to engage said valve rod and move the valve from its seating at the bottom of the hollow rod to cut off communication between said casing and the interior of the tyre.

4. A combined valve and pressure gauge adapted for use with pneumatic tyres and the like, comprising in combination a casing, a slidable piston on said casing, a loading plug adjustably connected to said casing, a spring between said loading plug and said piston, serving to enable the load on the spring to be set to enable the piston to function at any predetermined pressure, a recording cap attached to said casing and a rod connected to said piston extending through said loading plug and cap and having grooves thereon co-operating with the upper edge of the recording cap when moved by the air pressure within the tyre to an invariable extent, and serving as a feeler and sight gauge to indicate when the pressure within the tyre has reached or exceeded the pressure for which the loading plug has been set.

5. A combined valve and pressure gauge adapted for use with pneumatic tyres, comprising in combination, a casing, a slidable piston in said casing, a loading plug having a screw threaded engagement with said casing, a recording cap having a screw threaded engagement with the exterior of said casing, a spring between the upper face of said piston and said loading plug, a rod attached to said piston and extending through said loading plug and cap, markings on said rod co-operating with the upper edge of said cap, a longitudinal groove in said rod, a ring threaded on to said rod, a projection on said ring, engaging said groove, a longitudinal groove on the interior of said casing and a projection on the periphery of the ring engaging the groove in the casing.

JOHN ELPHINSTONE GRAHAM.